United States Patent [19]
Epperson et al.

[11] 3,745,303
[45] July 10, 1973

[54] GRILL-HEATER FOR RESTAURANT TABLE

[76] Inventors: Charles N. Epperson; Roy A. Human, both of 1203 S. Wood Drive, Okmulgee, Okla. 74447

[22] Filed: Oct. 18, 1971

[21] Appl. No.: 190,074

[52] U.S. Cl. ..................... 219/218, 99/450, 108/25
[51] Int. Cl. ............................................. H05b 1/00
[58] Field of Search .................. 219/218, 365, 378, 219/386, 399, 430, 432, 439; 99/408, 444–448, 450, 400; 126/41 R; 108/25

[56] References Cited
UNITED STATES PATENTS

| | | | |
|---|---|---|---|
| 3,527,154 | 9/1970 | Shaper | 99/446 X |
| 3,487,199 | 12/1969 | Hamlin | 219/399 |
| 2,790,434 | 4/1957 | Del Francia | 126/41 R |
| 1,693,522 | 11/1928 | Medearis | 219/430 |
| 2,746,378 | 5/1956 | Lang | 99/447 |

*Primary Examiner*—C. L. Albritton
*Attorney*—William S. Dorman

[57] ABSTRACT

A grill-heater for a restaurant table or the like comprising a housing projecting downwardly into a recess in the table and having a heater element mounted adjacent the bottom of the housing, an inner grid member mounted in the housing above the electrical heating element, a plurality of heat storing units, such as stones or rocks, supported on the inner grid member, and an outer grill member mounted at the top of the housing and being adapted to support food, such as steaks, thereon to heat or cook the same.

5 Claims, 6 Drawing Figures

Patented July 10, 1973

CHARLES N. EPPERSON
ROY A. HUMAN

INVENTORS

BY

William S. Dorman

ATTORNEY

CHARLES N. EPPERSON
ROY A. HUMAN

INVENTORS

BY

*William S. Dorman*

ATTORNEY

GRILL-HEATER FOR RESTAURANT TABLE

1. Field of the Invention

The present invention relates to grill-heaters and, more particularly, to a grill-heater of the type adapted to be placed in a central recess in a restaurant table where the patron can have individual control over the heating and/or cooking of his food.

2. The Prior Art

The prior art broadly teaches the idea of combininb a heating means with a table. Furthermore, the prior art teaches the use of electrical heating means together with thermostatic controls for maintaining temperature. However, the prior art does not show or suggest the feature of an inner grid member with separate heat storing bodies maintained thereof in positions spaced from the electrical heating unit to maintain a more even control of temperature.

Summary of the Invention

Eating out in a restaurant should always be a leisurely undertaking. Often times in the past, however, when eating steak, for example, the steak will become cold before the meal is finished. With the grill-heater of the present invention, the restaurant patron can cut off portions as desired, leaving the remainder of the steak on the grill to be kept warm. Also, in the event that the steak is not sufficiently cooked to meet the whims of the particular patron, the steak can be left on the grill-heater for further cooking.

The grill-heater of the present invention is located in a rectangular, and preferably centrally located, opening in the restaurant table. The surface of the table surrounding the opening will provide sufficient space for plates, eating utensils and the like. A downwardly projecting housing is provided in the rectangular opening in the table and an electrical heating element is located adjacent the bottom of the housing. Preferably, a sheet or layer of asbestos wool is located at the bottom of the housing below the heater element. Above the heater element there is located an inner grid member on which is supported a plurality of heat retaining units such as rock, stone, or, possibly, other ceramic materials. At the top of the housing is located an outer grill member upon which the steaks or other food can be heated or further cooked. A cover member can also be placed over the grill-heater. An insulating member made of sheet asbestos material will surround the bottom of the housing to prevent unnecessary heat loss. Thermostats and thermostatic controls can be provided as desired, with individual controls for each table being provided as desired.

In one modification of the present invention, a cover member is provided with one or more openings in which one or more vessels can be received for the purpose of heating or cooking liquids containing vegetables or sauces. Thus, an entire meal can be cooked and-/or heated at each table.

Whereas the upper opening of the housing is preferably circular the shape of the outer grill member is preferably rectangular so as to provide openings in the corners of the grill member where the steak of other food can be placed without exposing the same to the direct heat of the grill heater unit.

The employment of heat storing or heat retaining means on an inner grid member separate from the heating unit provides a smooth control of the temperature within each heating unit and, at the same time, prevents contact between the heat storing units and the heating element which might otherwise damage the heating element or interfere with the proper operation thereof.

Brief Description of the Drawings

Referring to the drawings in detail, FIG. 1 shows a restaurant table 10 having a relatively flat table top 12 and a plurality of legs 14. By the term "restaurant table" it is merely intended to connote that the present invention will have greater applicability in a commercial sense; however, the table could be described as a picnic table or other table which could even be used in the home, if desired.

Figure 1:
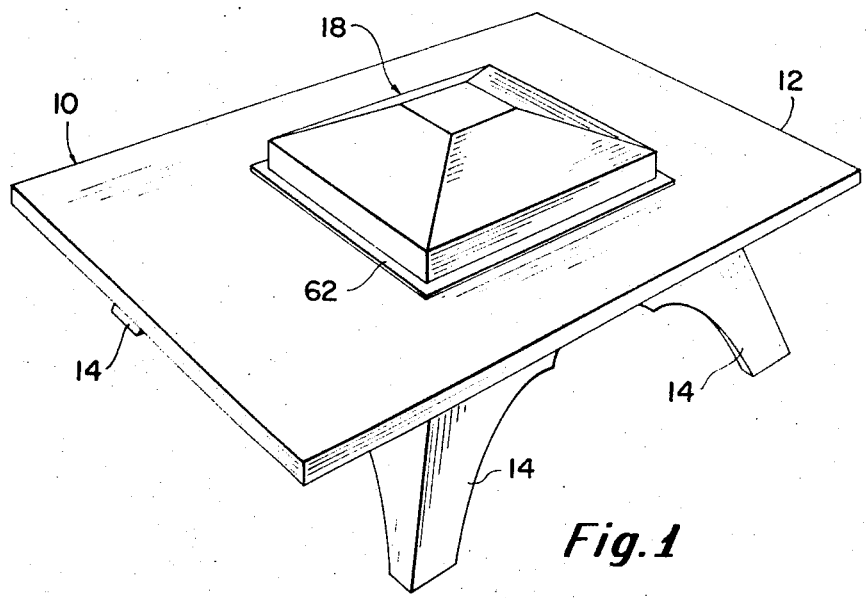
FIG. 1 is a perspective view of the table in which is mounted the grill-heater of the present invention with cover thereon.

The table top 12 is provided with a rectangular opening 16 in which is mounted or received the various elements of the heater-grill of the present invention as generally designated by the reference character 18. The grill-heater 18 includes an outer and lower casing 20 which can be made of fiberglas, molded asbestos, etc. The outer casing 20 is shaped so as to provide a recess 22 and flat side edges 24 which rest on the edge of the table top 12 surrounding the opening 16. A housing 26, preferably of metal, is mounted over the casing 20 and is shaped so as to provide a recess 28 and flattened side edges 30 which rest against the flattened side edges 24 of the casing 20 around the periphery of the opening 16. The flattened side edges 30 terminate in a vertical flange 32 extending circumferentially and rectangularly around the top of the casing 26. An electrical heating element 34 is mounted in the housing 26 adjacent the bottom of the recess 28. A layer 36 of insulating material, such as asbestos wool, or the like, lies on the bottom of the housing 26 below the heater 34. Above the heater element 34 there is mounted an inner grid member 38 which is adapted to support thereon a plurality of heat storing units 40. The heat storing units could be a plurality of rocks or stones or ceramic bodies.

At the upper end of the housing 26 there is mounted an outer grill member 42 which is essentially rectangular in shape and which sits in the rectangular space formed by the flanges 32. A rectangular cover member 44 having a downwardly directed flange 46 is adapted to enclose the grill-heater 18. The flange 46 is adapted to be received in the rectangular space formed by the flange 32 immediately above the outer grill member 42; obviously, the cover could be fitted onto the top of the grill heater 18 in a number of other different ways.

Figure 5:
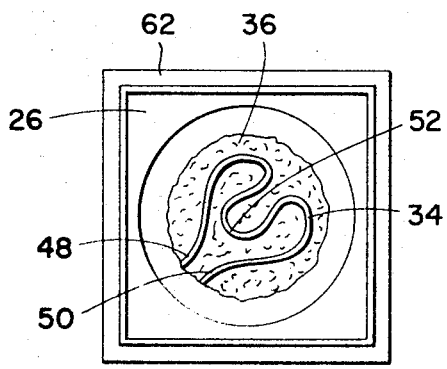
FIG. 5 is another plan view of the grill heater with the cover, outer grill member and inner grid member removed.

As best shown in FIG. 5, the two ends 48 and 50 of the electrical heating element 34 project inwardly into the interior of the housing 26 at one side thereof, flare outwardly from each other past the center of the bottom end, then converge towards each other, then form a loop 52 which is directed back towards the point of entry of the ends 48 and 50; the resulting outline presents a modified wishbone effect.

Figure 4:
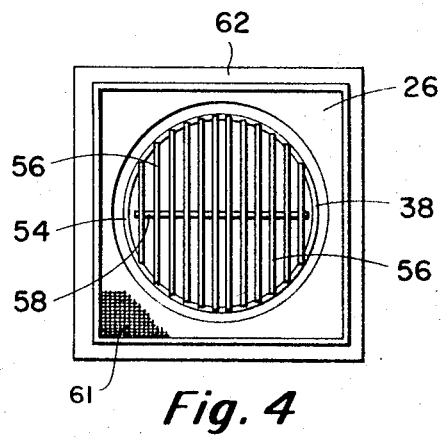
FIG. 4 is another plan view of the grill heater with the cover and outer grill member removed.

As best shown in FIG. 4, the inner grid member 38 is formed by a circular ring 54, a plurality of parallel rods 56 welded at their ends to the ring 54 and a transverse diametrical rod 58 which is welded to the parallel rods. The rods 56 are spaced sufficiently close to each other to prevent the stones 40 from falling therethrough and contacting the heater element 34 so as to possibly damage the same.

Figure 3:
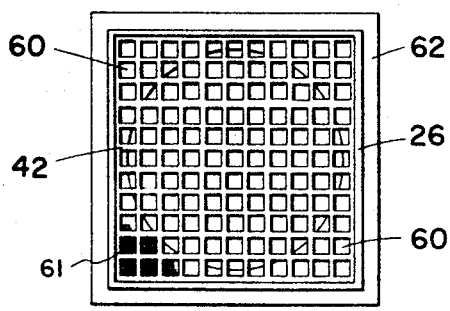
FIG. 3 is a plan view of the grill heater itself with the cover removed.

As best shown in FIG. 3, the outer grill member 42 is comprised of a metal casting having a plurality of rectangular holes 60 therein. If steak or bread is placed over the holes 60 near the center of the grill 42, the heating effect thereon will be the maximum; however, it should be apparent that the food article could be placed over the holes 60 adjacent the corners of the grill 42 so as to be out of the direct path of heat.

Figure 2:
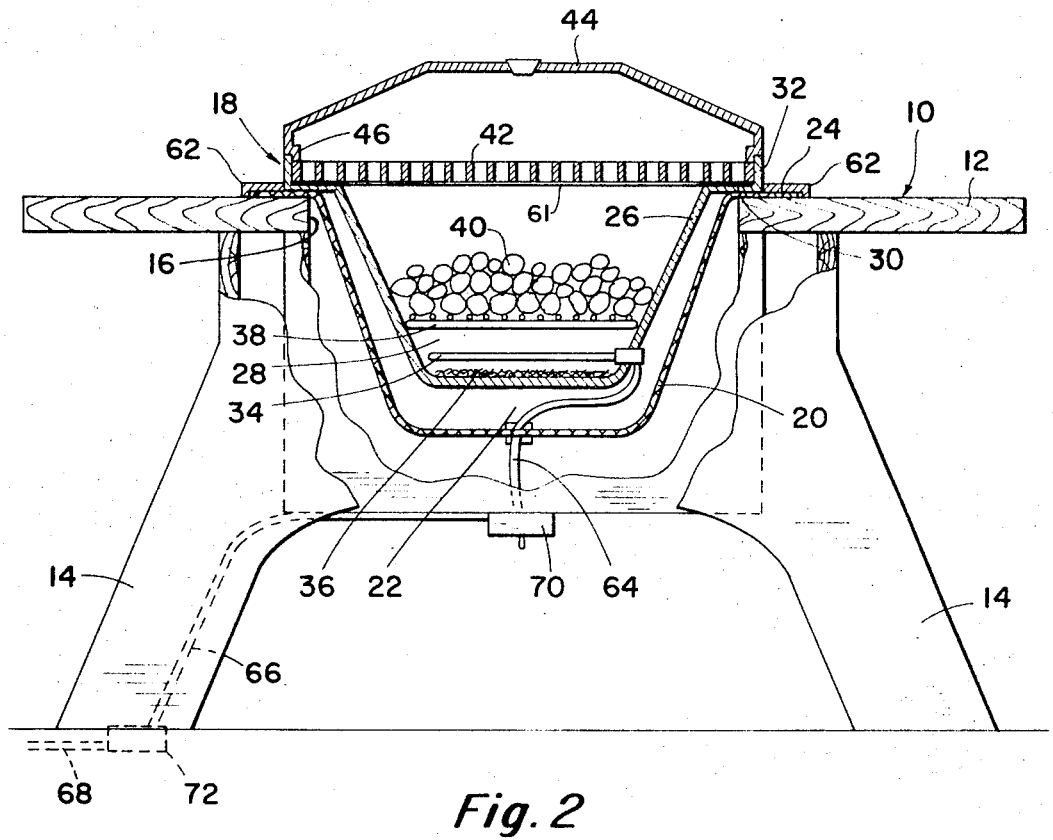
FIG. 2 is a side elevation of the table of FIG. 1 with the grill-heater shown in transverse cross section.

As shown in FIGS. 2 and 4, a fine-wire mesh screen 61 is adapted to underlie the outer grill member 42. This screen 61 is of rectangular shape and exactly fits inside of the rectangular space formed by the flanges 32. The purpose of this screen is to effectively catch all particles such as bread crumbs, pieces of steak, etc. which fall through the holes 60 in the grill 42 and which would otherwise fall into the heating cavity below. Thus, the screen 61 prevents pieces of steak or bread from falling on the storing units 40 so as to eliminate undesirable odors of burning food and smoke. Furthermore, this screen provides an additional safety feature in that a person cannot readily insert a knife or fork or skewer through the grill 42 into the heating cavity and make contact with the heating element 34, so as to cause damage or shock.

The outer edges of the flattened portions 24 are covered by a rectangular metallic member 62. The heater 34 is connected to any convenient source of electrical power (not shown) by means of various conduits 64, 66 and 68 and junction boxes 70 and 72. Where there are a plurality of tables 10 with grill-heaters 18 mounted therein, it is preferable that a separate electrical control (not shown) be provided to permit individual control of each unit.

Figure 6:
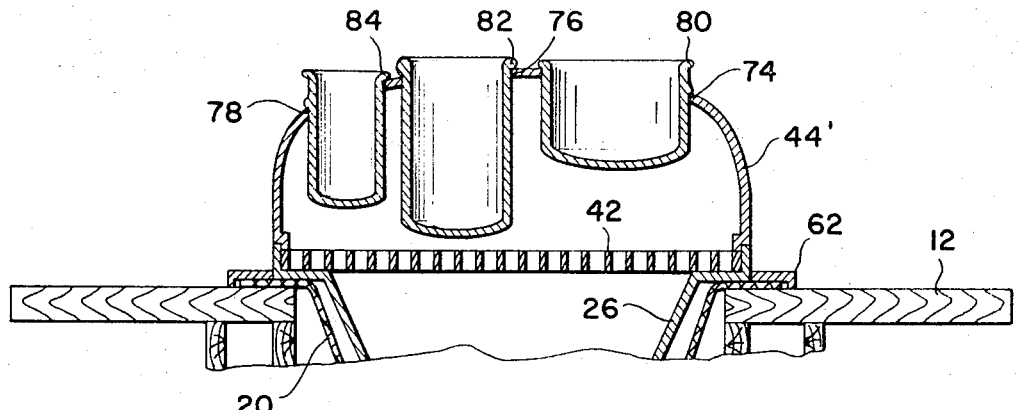
FIG. 6 is a fragmentary view similar to FIG. 2 showing the details of a modified cover arrangement.

FIG. 6 shows a modification which permits the heating of vegetable dishes, sauces and the like. In this instance, the cover 44' is provided with a plurality of openings 74 and 76 and 78 in which are received vessels 80, 82 and 84, respectively. The vessels may be provided with individual covers (not shown) if desired. The lower ends of the vessels 80, 82 and 84 will project downwardly into the space above the outer grill 42 but will be exposed to the heat provided by the heater element 34 and as radiated by the heat-storing units 40. Thus, any vegetables or sauces or the like contained in the vessels would be heated.

A thermostat (not shown) is preferably located within the housing 26 and any convenient thermostatic control (not shown) can be employed to regulate the temperature within each grill-heater unit 18. The heat-storing rocks 40 provide a more even temperature condition within the grill-heater unit and compensate for the on and off fluctuations of the heater unit 34. The inner grid 38 isolates the heat-storing rocks 40 from the heater unit 34 and prevents the heat-storing rocks from damaging the heater element 34 or from causing unequal localized heating conditions at the surface of the heating element 34.

Since the source of heat for the grill-heater units is electrical, the creation of smoke, gases, etc. will be kept to a minimum; however, it is preferable that an exhaust opening (not shown) be located in the ceiling above the tables.

The present invention has been described in particular relation to a single grill-heater unit 18 for each table 10; however, it should be understood that there might be situations where it would be desirable to have elongated tables with a plurality of grill-heater units 18 set in spaced recesses along the elongated table.

Whereas the present invention has been described in particular relation to the drawings attached hereto, it should be understood that other and further modifications, apart from those shown or suggested herein, may be made within the spirit and scope of this invention.

What is claimed is:

1. A grill-heater for restaurant tables or the like comprising a housing adapted to project downwardly into a recess in the table, said housing being open at the upper end thereof, an electrical heating unit mounted adjacent the bottom of said housing, an inner grid member mounted in said housing and spaced above said electrical heating unit and being adapted to support thereon a plurality of heat storing members and an outer grill member supported over the upper end of said housing for heating food thereon.

2. The improvement according to claim 1 including an outer casing also mounted in said recess below said housing and surrounding the same.

3. Improvement according to claim 1 including a cover member supported above said outer grill member.

4. The improvement according to claim 3 wherein said cover is provided with at least one aperture and a cooking vessel received in said aperture and supported by said cover for heating food in said vessel over said outer grill member.

5. The improvement according to claim 1 including a fine-wire mesh screen supported over the upper end of said housing and underlying said outer grill member.

* * * * *